United States Patent [19]

Rosenberg

[11] Patent Number: 5,463,307
[45] Date of Patent: Oct. 31, 1995

[54] HIGH EFFICIENCY, LOW VOLTAGE ADAPTER APPARATUS AND METHOD

[76] Inventor: Steven Rosenberg, 1307 Maple Ave., South Plainfield, N.J. 07080

[21] Appl. No.: 318,529

[22] Filed: Oct. 5, 1994

Related U.S. Application Data

[63] Continuation of Ser. No. 986,514, Dec. 7, 1992, abandoned.

[51] Int. Cl.[6] ........................................................ G05F 5/02
[52] U.S. Cl. ........................................... 323/300; 323/237
[58] Field of Search .................................. 323/237, 238, 323/239, 241, 242, 300, 322, 323, 324, 325, 326

[56] References Cited

U.S. PATENT DOCUMENTS

| | | | |
|---|---|---|---|
| 3,548,290 | 12/1970 | Swinehart | 318/447 |
| 3,742,337 | 6/1973 | Dignette | 323/19 |
| 3,942,086 | 3/1976 | Bresler | 318/447 |
| 4,634,957 | 1/1987 | Hollaway | 323/242 |
| 4,783,729 | 11/1988 | Konopka | 363/143 |
| 4,878,010 | 10/1989 | Weber | 323/300 |
| 4,924,109 | 5/1990 | Weber | 307/126 |
| 4,965,509 | 10/1990 | Oldham | 323/300 |
| 5,036,234 | 7/1991 | Friedrich et al. | 307/632 |

*Primary Examiner*—Peter S. Wong
*Assistant Examiner*—Adolf Berhane
*Attorney, Agent, or Firm*—Plevy & Associates

[57] ABSTRACT

A circuit can control the power to a load having a predetermined voltage rating. The circuit includes a first terminal adapted to connect to the load and a second terminal adapted to be connected through a power switch to an alternating voltage source. This voltage source has a magnitude rated substantially in excess of the predetermined voltage rating. A switching device is serially connected between the first and second terminal. Also, a capacitive filter circuit has dual terminals separately connected to the first and second terminals. This filter can shunt from the switch transient currents flowing through the load. A timing circuit is coupled to the switching device for periodically operating it at a frequency proportional to that of the alternating voltage source. The switching device is timed by the timing circuit to keep the magnitude of average voltage to the load less than that of the alternating voltage source, for each half cycle of the alternating voltage source.

35 Claims, 2 Drawing Sheets

HIGH EFFICIENCY, LOW VOLTAGE ADAPTER APPARATUS AND METHOD

This is a continuation of application Ser. No. 07/986,514, filed on Dec. 7, 1992, now abandoned, entitled Power Control Circuit.

BACKGROUND OF THE INVENTION

1. Field of the Invention

The present invention relates to power control circuits, and in particular to a timed switching circuit for reducing the average voltage applied to a load.

2. Description of Related Art

With the increasing costs of energy, the demand for energy saving devices is easily justified economically. Electrical power conversion is performed routinely but still is relatively inefficient. In addition power conversion is often not performed because of these inefficiencies, when conversion might otherwise seem appropriate. For example, voltage saturation often occurs with appliances powered by house current, because this voltage is often greater than need be. This mismatch may constitute a waste of 25% to 35% of useful power.

Power supply voltages have been transformed in two ways: a ferromagnetic transformer or by a sine wave switching. Solid state devices such as triacs or silicon control rectifiers (generically referred to as thyristors) facilitate sine wave modification. Still there is a need for a more efficient techniques to increase the general efficiency of power usage.

Known dimmer circuits vary the conduction angle through a thyristor to establish a desired drive to a load. These circuits typically provide adjustment up to 100% conduction. While these known dimmer circuits employ thyristors, they have not been designed to supply a stable, reduced, secondary voltage with a static conduction angle.

Such conventional dimmer circuits have been marketed as energy conservation devices wherein reducing the drive to a load such as a lamp can produce modest to large savings. (See for example Energi-Saver dimmer by Energy Saver, Center Valley, Pa.). These known dimmers however, have not provided special features for reducing power while still maintaining a high level of brightness and service. See also NASA Motor-Control Circuit, *Popular Electronics*, Oct. 1979, page 39.

Other known circuits employing silicon controlled rectifiers have employed restive capacitive circuit in parallel with the with the thyristors to facilitate commutation. Without proper circuitry to facilitate such commutation, certain loads (e.g., inductive loads) can produce transients that adversely affect the conduction of the thyristor and may prevent it from turning off at the end of a half cycle. F. W. Gutzwiller, *Silicon Controlled Rectifier Manual*, at 183–187 (1967).

Other known thyristor switching circuits have dealt with cycle skipping, that is, a failure to ever conduct during a half cycle as intended. For example, known circuits have employed unijunction transistors with a resistor-capacitor timing circuit for triggering the unijunction. There is a risk of the capacitor in the unijunction timing circuit not fully discharging at the end of a half cycle. If the capacitor does not fully discharge, then the unijunction may not fire later and may skip one or more half cycles. Known solutions to the cycle skipping problem are employing resistors in the appropriate position in the unijunction circuit at the proper value.

Also, unijunction triggers for activating thyristors can at times be sensitive to power transients. One known technique for immunizing the unijunction transistor is to connect a bootstrap capacitor between base 2 (the higher voltage base) and the emitter of the unijunction transistor. Id. at 338.

Another disadvantage with such known converters is the inability to handle high power. Known circuits have employed silicon controlled rectifiers connected in parallel. The gates of these controlled rectifiers have been triggered by a pilot silicon controlled rectifier. This arrangement allows a pilot rectifier of modest power rating to control a large bank of rectifiers, thereby increasing the effective power handling capacity. Id. at 131

A known voltage converter (U.S. Pat. No. 3,430,101) employs a thyristor switch that reduces the conduction angle of current through an incandescent lamp. The converter works with house current whose voltage magnitude is rated at 120 volts, 60 Hertz. By reducing the conduction angle, this relatively high voltage can drive a low voltage lamp rated at 12 volts. A disadvantage with this known converter is that it is a three wire system: one wire to a supply line, a second wire to the other supply line and one terminal of the lamp, and the third wire to the other terminal of the lamp. Thus if such a circuit were mounted at a wall switch, three wires must be routed from the switch box, instead of the usual two. See also U.S. Pat. Nos. 3,358,186; 3,493,848; 3,525,015; and 3,684,919.

SUMMARY OF THE INVENTION

In accordance with the illustrative embodiments demonstrating features and advantages of the present invention, there is provided a power control circuit for a load having a predetermined voltage rating. The circuit has a first terminal adapted to connect to the load and a second terminal adapted to be connected through a power switch to an alternating voltage source. This source has a magnitude rated substantially in excess of the predetermined voltage rating. A switching means is serially connected between the first and second terminals. Also included is a capacitive filter means having dual terminals separately connected to the first and second terminals for shunting from the switching means transient currents flowing through the circuit. The power control circuit also has a timing means coupled to the switching means for periodically operating the switching means at a frequency proportional to that of the alternating voltage source. The switching means is timed by the timing means to keep the magnitude of average voltage to the load less than 90 degrees of the alternating voltage source for one alternate half cycle of the alternating voltage source.

In a related method of the same invention, power is controlled to a load having a predetermined voltage rating from an alternating voltage source having magnitude rated substantially in excess of the predetermined voltage rating. The method includes the step of periodically switching the voltage source to the load at a frequency proportional to that of the alternating voltage source. The switching is timed to keep the magnitude of average voltage to the load less than 90 degrees of the alternating voltage source for one alternate half cycle of the alternating voltage source. Another step is capacitively shunting transient currents flowing through the circuit.

The high efficiency provided by such apparatus and methods exceeds conventional expectations. When a static conduction angle is matched to a predetermined minimum power consumption grade, the efficiency of any standard load can be improved. The switching devices herein can perform similar function as a ferromagnetic step down transformer. Such transformers will only reduce voltage with a 15% power loss. The switching control described herein is much more efficient.

It was also discovered that a significant percentage savings in power consumption is achieved for light bulbs, household appliances, machinery, or other equipment. This savings can convert to significant savings when examined over a course of a month. Current observations suggest that for a standard or conventional 100 watt light bulb about 35% of the line voltage is unnecessary for producing a brilliantly lit bulb. By eliminating this unnecessary margin the cost of power can be discounted significantly.

Also by operating a low voltage bulb from a switched high voltage power source, the low voltage lamp produces the same apparent brightness as conventional lamps but at a reduced power consumption. The series of pulses produced by the switching circuit produces relatively high but short current pulses. Because of the high current and brief duration, the power transfer is relatively efficient. Also, a physiological effect makes the lamp appear to be as bright as a bulb consuming more power, although the switched voltage actually delivers approximately ¾ (or somewhat greater) of the normal power.

In a preferred embodiment, a relatively low voltage incandescent lamp is powered through a switching thyristor. The conduction angle is reduced so that the low voltage bulb is not destroyed by the relatively high voltage source. In this preferred embodiment, current is switched to conduct in one direction. The thyristor is triggered by a unijunction transistor. The unijunction transistor is itself triggered by a resistive capacitive circuit connected to the emitter of the unijunction transistor. One of the bases of the unijunction transistor connects to the gate of the thyristor, which is serially connected with the low voltage lamp and power supply.

The large difference in voltage between the supply line and the voltage on the load presents an inherent problem of sensitivity to line transients reaching the load, which causes an overvoltage and immediate destruction of the load. Accordingly the power control circuit is designed to be free of instability in this aspect.

The preferred circuit has features to enhance immunity from power supply variations and to avoid unintended cycle skipping. Preferably, the unijunction transistor has a capacitor coupled between base 2 and the emitter, while a shunting capacitor is connected to the gate of the thyristor.

The preferred power control circuit employs a series resistor-capacitor filter connected in parallel with the thyristor. This circuit shunts power supply transients away from the thyristor. Because of its configuration, the filter does not require a third wire. Thus, the switching circuit can be treated as a two terminal device and may be connected in series with a wall switch so that only two wires emerge from the switch box.

Also in the preferred embodiment, the lamp is connected in the cathode circuit of the thyristor while the anode connects (preferably through a power switch) to one of the terminals of the power supply, with the other power line connecting to the other line of the lamp.

BRIEF DESCRIPTION OF THE DRAWINGS

The above brief description as well as other objects, features and advantages of the present invention will be more full appreciated by reference to the following detailed description of presently preferred, but nonetheless illustrative embodiments in accordance with the present invention, when taken in conjunction with the accompanying drawings, wherein.

DETAILED DESCRIPTION OF THE PREFERRED EMBODIMENTS

Figure 1:
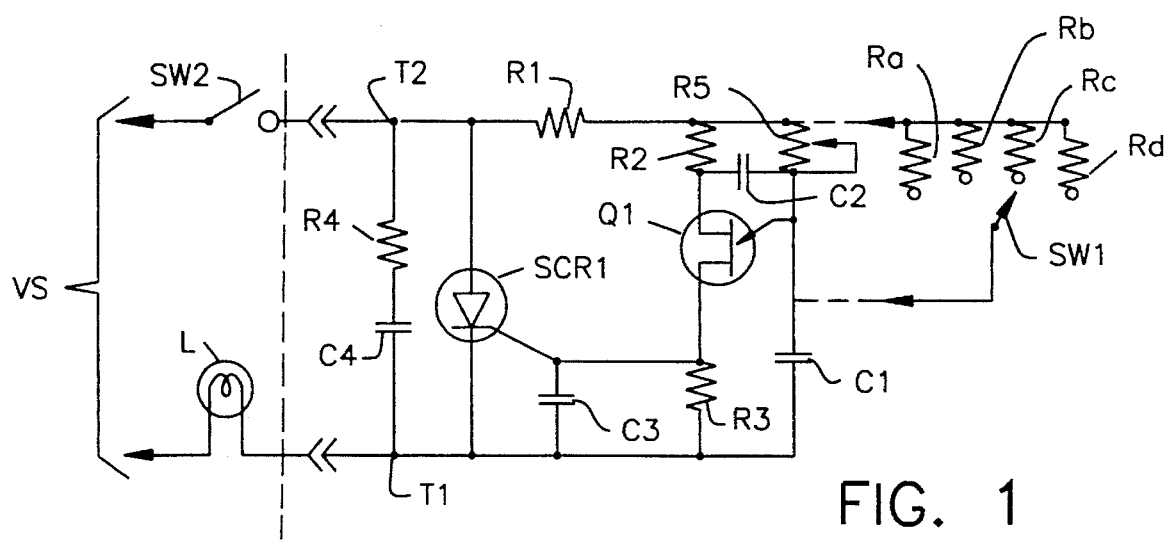
FIG. 1 is a schematic diagram of a power control circuit in accordance with the principles of the present invention.

Referring to FIG. 1, a power control circuit is shown employing a switching means having a thyristor SCR1 and a timing means having a semiconductor device Q1. Device Q1 is a unijunction transistor, for example, a GE type 2N2646 or 2N2647. Transistor Q1 has a main electrode (base 1) connected through resistor R3 to first terminal T1. The other main electrode of transistor Q1 (base 2) connects through the serial combination of resistors R1 and R2 to second terminal T2. Variable resistor R5 connects between the junction of resistors R1 and R2 to the emitter of transistor Q1 (also referred to as a trigger terminal). A capacitive element C2 connects between base 2 of transistor Q1 and its emitter. A capacitor C1 connects between the emitter of transistor Q1 and terminal T1.

Resistors R1 and R5 (referred to as a resistive divider) together with capacitor C1 constitute a resistive capacitive network that operates as a timing circuit. The variable resistor R5 can be replaced with a rotary switch SW1 in which case its wiper connects to the emitter of transistor Q1 and its switched terminals separately connect through resistors Ra, Rb, Rc and Rd to the junction of resistors R1 and R2. In still other embodiments variable resistor R5 can be replaced with a fixed resistor to set the conduction angle of the circuit at a non adjustable value. Additionally, R5 can be replaced with any variable resistance control element.

Semiconductor unit SCR1 is shown as a thyristor (silicon controlled rectifier) having its anode connected to terminal T2 and its cathode connected to first terminal T1. Thyristor SCR1 is, for example, a Tandy type 276-1067 having a maximum on-state current of 6 amps and a peak reverse voltage of 200 volts maximum, although other component types are anticipated depending upon the environment. The gate electrode of thyristor SCR1 connects to first terminal T1 through capacitive shunt C3, which is connected in parallel with resistor R3.

A capacitive filter means is shown herein as a resistive-capacitive circuit employing resistor R4 and capacitor C4, which are serially connected between terminals T1 and T2.

First terminal T1 connects to one terminal of load L, whose other terminal connects to the low side of alternating voltage source VS. The hot side of source VS connects through power switch SW2 to terminal T2. It is advantageous to connect the lamp L to the cathode circuit of thyristor SCR1 and the power switch SW2 in the anode circuit. This latter configuration tends to avoid the effects of noise and other interferences that may tend to adversely affect the thyristor and its timing. Alternating voltage source VS may be conventional house current operating at nominally 115 VAC, although it will be appreciated that operation at different voltages are possible as well. Furthermore, lamp L1 need not be incandescent but may be a halogen or other type of lamp. Furthermore load L need not be a light and in other embodiments, various loads may be powered, including motors, electronic equipment, household appliances, etc. Furthermore, any 3 or 4 wire configuration may be used.

Although the various components values employed in FIG. 1 may vary, depending upon the environment, in this embodiment the following values were used:

Capacitors:
  C1—0.10 micro farads, 200 V;
  C2—0.05 micro farads, 50 V;
  C3—0.05 micro farads, 200 V;
  C4—0.22 micro farads, 200 V (Mylar)

Resistors:
  R1—33K Ohms, ½ W
  R2—100 Ohms, ¼ W
  R3—47 Ohms, ¼ W
  R4—100 Ohms, ¼ W Resistor R5 is chosen to provide a brightness from lamp L that appears approximately the same as the brightness when a conventional lamp is driven at its rated voltage by a conventional voltage source.

To facilitate an understanding of the principles associated with the foregoing circuit, its operation will now be briefly described in connection with the timing diagram of FIG. 4. For the first positive half cycle of FIG. 4 the voltage VS rises sinusoidally, in this example, past the peak value. While this voltage rises, capacitor C1 is charged through resistors R1 and R5. While the capacitor is charging, transients coupled to resistor R1 and R5 will be coupled to both the emitter and base 1 of unijunction transistor Q1. The tendency to trigger transistor Q1 will be diminished by capacitor C2.

When capacitor C1 is charged to a threshold value, the emitter of transistor Q1 will conduct. As a result, capacitor C1 will quickly discharge into resistor R3 and capacitor C3. Because capacitor C1 fully discharges, the tendency to skip cycles is avoided. Also, because base resistor R2 is connected at the junction of resistors R1 and R5 it has a reduced drive voltage which reduces the overall current load through transistor Q1. In addition, shunting capacitor C3 reduces the sensitivity of thyristor SCR1 to transients that may prematurely trigger it.

The increased voltage on the gate of thyristor SCR1 triggers it into conduction. Consequently, a circuit is formed so that alternating voltage source VS can unidirectionally conduct through switch SW2, thyristor SCR1, and lamp L.

Figure 4:
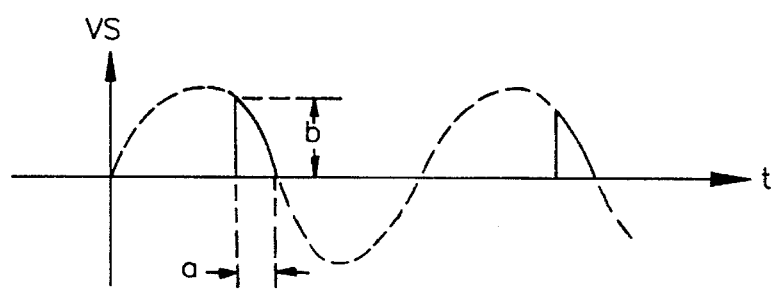
FIG. 4 is a timing diagram showing voltages associated with the circuit of FIGS. 1–3.

The conduction angle is represented by interval a in FIG. 4 wherein the voltage applied to lamp L starts at a high voltage b and diminishes to zero. In one embodiment the static phase angle was set at approximately 50 degrees to supply approximately 80 VDC peak instantaneous. At the zero crossing, thyristor SCR1 is typically reverse biased and stops conducting. Resistive capacitive circuit R4, C4 assists the commutation of thyristor SCR1, which may have a tendency to keep conducting after the supply VS has reversed polarity, especially when load L or source VS has an inductive component. Capacitor C4 tends to compensate for such inductive impedance so that commutation occurs properly. Resistive capacitive circuit R4, C4 also act as a shunt should switch SW2 bounce. Morevoer, inductive impedance may tend to produce a rather high transient voltage across thyristor SCR1 when it attempts to turn off. Capacitor C4 helps to avoid such high voltage transients. Thus with the foregoing circuit, a precise control of the conduction angle is achieved. The conduction angle is stabilized from line voltage fluctuations and essentially does not vary with such variations. As can be seen from FIG. 4, the angle of conduction is less than 90 degrees and between the angles of 90 and 180 degrees. In this way, conduction occurs on the descending slope of the cycle and subsequent to the peak voltage, whereby the voltage is always decreasing.

Experiment has shown that a lamp L1 may be a low voltage lamp rated for example at 30 VAC. Since the power supply VS is rated at 115 VAC, this power cannot be directly applied to lamp L1 without destroying it. Consequently, capacitor C1 and resistors R1 and R5 are chosen to provide for a relatively small conduction angle through the lamp L1. Experiments have shown that when the lamp L1 is powered by the wave shape shown in FIG. 4, the amount of power applied to the lamp L1 can be less than that delivered an ordinary 115 VAC full wave signal, and still provide the same apparent brightness. This apparent brightness is achieved through a combination of the burst of physical heating of the lamp filament and the physiological effect of judging brightness based upon the observer's opinion of brightness. While the reduction in power voltage may reduce the measured lumen output of a light bulb, in appropriate settings where little light is needed for extended periods of times, (for example a light post or a night light) such lumen reduction may never be noticed.

Figure 2:
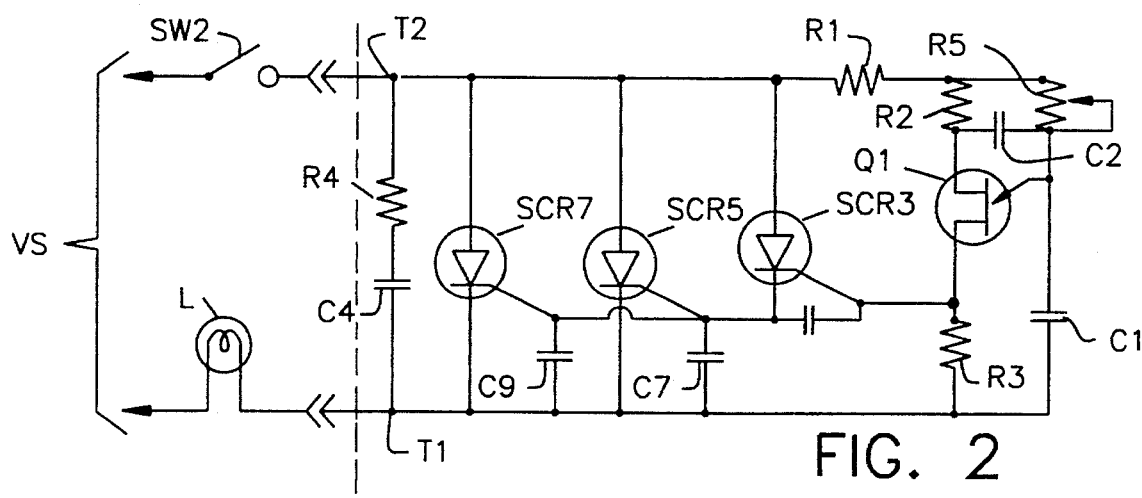
FIG. 2 is a schematic diagram of a circuit that is an alternate to that of FIG. 1.

Referring to FIG. 2, an alternate power control circuit is illustrated, wherein components having the identical reference number as in FIG. 1 are the same components configured identically with respect to terminals T1 and T2 as before. In this embodiment, base 1 of unijunction transistor Q1 connects to the gate electrode of a pilot thyristor SCR3 whose anode connects to terminal T1 and cathode connects to the gates of a pair of main thyristors SCR5 and SCR7 whose anodes connect to second terminal T2 and cathodes connect to first terminal T1. The common terminal at the gates of thyristor SCR5 and SCR7 are shunted to first terminal T1 by a pair of parallel capacitors C7 and C9 operating as a capacitive shunt.

The operation of the power control circuit of FIG. 2 is identical to that described before except that upon the triggering of unijunction transistor Q1 its base 1 triggers the gate of pilot thyristor SCR3, which conducts to trigger the gates of parallel thyristors SCR5 and SCR7. Since thyristor SCR3 does not carry the main power it can have a relatively small rating and therefore a relatively a small amount of signal energy need be provided by unijunction transistor Q1 to trigger thyristor SCR3. An amplified trigger signal however is provided by thyristor SCR3 which is capable of triggering the main thyristors SCR5 and SCR7. As before, capacitors C7 and C9 provide stability and noise immunity for the thyristors.

Figure 3:
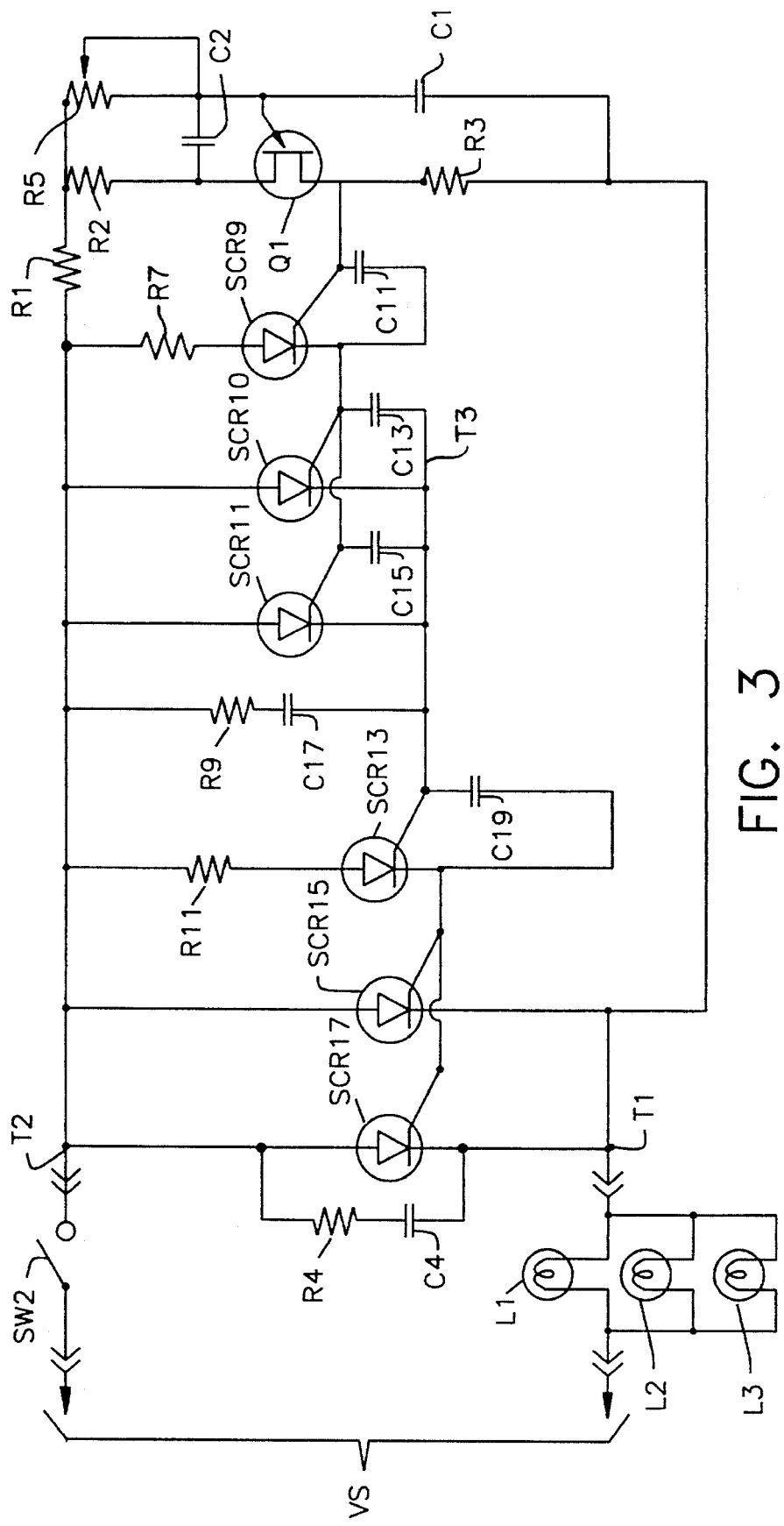
FIG. 3 is still another alternate embodiment.

Referring to FIG. 3, a higher power handling circuit is illustrated in which previously mentioned power switch SW2 applies power through the power control circuit to a bank of lamps L1, L2 and L3. The switch SW2 and lamp L1 are configured the same as before with respect to terminals T1 and T2 except that additional lamps L2 and L3 are connected in parallel to lamp L1. Similarly connected as before are resistor R4 and capacitor C4, as well as the unijunction transistor Q1 and its supporting elements. The unijunction transistor Q1 employs the same components configured in the same manner as before, except that the circuit does not connect directly to terminal T1 but connects thereto through capacitor C19. Otherwise, elements numbered identically as before are of the same value and connected in the same configuration as before.

Base 1 of unijunction transistor Q1 is connected to second capacitive shunt C11 (shunting to terminal T3) and to the gate of a second pilot thyristor SCR9 whose anode connects through resistor R7 to second terminal T2 and whose cathode connects to the gates (an intermediate terminal) of a pair of intermediate thyristors SCR10 and SCR11, whose anodes and cathodes connect in parallel to terminals T2 and T1, respectively. The intermediate terminal is shunted to terminal T3 through parallel capacitors C13 and C15, an intermediate capacitive shunt.

The series combination of resistor R9 and capacitor C17 are connected in parallel across thyristors SCR10 and SCR11. This combination facilitates commutation in a manner similar to that described previously in connection with resistor R4 and capacitor C4.

Terminal T3 connects to the gate of a first pilot thyristor SCR13. The anode of thyristor SCR13 connects through resistor R11 to second terminal T2 while the cathode connects to the gates of a pair of power thyristors SCR15 and SCR17. The gate of thyristor SCR13 is shunted to terminal T1 by a first capacitive shunt C19. The anodes of thyristors SCR15 and SCR17 connect to terminal T2 while their cathodes connect to terminal T1.

In operation, unijunction transistor Q1 operates as before to provide a pulse which then triggers pilot thyristor SCR9, which is immunized from noise and transients by capacitive shunt C11. Upon conducting, pilot thyristor SCR9 triggers both gates of intermediate thyristors SCR10 and SCR11, which themselves immunized by capacitive shunts C13 and C15. This effectively amplifies the output of unijunction transistor Q1 so that a relatively large signal is provided through thyristors SCR10 and SCR11. This amplified signal is applied to the gate of pilot thyristor SCR13 whose gate is immunized from noise and transients by capacitive shunt C19. Resistor R9 and capacitor C17 aid commutation in a manner similar to components R4, C4. Upon conducting, thyristor SCR13 triggers power thyristors SCR15 and SCR17 which can be a pair of high power thyristors, although one power thyristor may be used.

While a bank of lamps L1–L3 are shown, the multiple stage switching of the circuit of FIG. 3 can handle relatively high power such as various electromagnetic devices, household appliances, factory machinery, etc.

It is to be appreciated that various modifications may be implemented with respect to the above described preferred embodiments. For example, while a timing circuit is shown employing a unijunction transistor, other embodiments may employ various timing devices including other semiconductors, integrated circuits, mechanical, fiber optic, timers, etc. Also, the thyristor switches may be replaced by bipolar transistors or other switching devices having a speed and power handling capacity adequate for the purposes. Also, the various component values, speeds, temperature stability, power handling capacity can be altered depending upon the application and the desired performance characteristics. Also, while pulsating unipolar voltage was just disclosed, in other embodiments bipolar voltage pulses can be produced as well.

Moreover, in some embodiments, the power control circuit may be packaged with a solid state circuit breaker, a central digital conservation system or may be packaged in a light switch or other small packages. For example, the control circuit can be packaged in a threaded base that screws into a conventional light fixture and which has a socket for receiving a low voltage lamp.

Obviously, many modifications and variations of the present invention are possible in light of the above teachings. It is therefore to be understood that within the scope of the appended claims the invention may be practiced otherwise than as specifically described.

I claim:

1. A power control circuit for a load having a predetermined voltage rating, comprising:

a first terminal adapted to connect to said load;

a second terminal adapted to be connected through a power switch to an alternating voltage source having a magnitude rated substantially in excess of said predetermined voltage rating:

a switching means serially connected between said first and second terminal;

capacitive filter means having dual terminals separately connected to said first and second terminals for shunting from said switching means transient currents flowing through said load;

timing means coupled to said switching means for periodically operating said switching means at a frequency proportional to that of said alternating voltage source for less than one quarter of a full cycle of said alternating voltage source and only during positive half cycles of said alternating voltage source, said switching means being timed by said timing means to keep the magnitude of average voltage to said load substantially less than that of said alternating voltage source.

2. A power control circuit according to claim 1, wherein said timing means is selectively adjustable to set the magnitude of average voltage to said load.

3. A power control circuit according to claim 1 wherein said switching means is activated by said timing means during alternate positive half cycles of said alternating voltage source, said switching means being operable only during the negative transition of said alternate positive half cycles, wherein the voltage applied to said load starts at a substantially instantaneous rate of rise at a high value subsequent to the peak voltage of said half cycles and diminishes to zero.

4. A power control circuit according to claim 1 wherein said timing means comprises:

a semiconductor device having a trigger terminal and a pair of main electrodes, at least one of said electrodes being connected to said switching means, said semiconductor device being rendered conductive by a magnitude of voltage in excess of a predetermined threshold at said trigger terminal; and a timing circuit connected to said trigger terminal for supplying to it a triggering voltage.

5. A power control circuit according to claim 4 wherein said semiconductor device comprises:

a unijunction transistor having said trigger terminal and said pair of main electrodes; and a capacitive element coupled between said trigger terminal and one of said main electrodes for providing a degree of immunity to supply transients.

6. A power control circuit according to claim 5 wherein said timing circuit comprises a resistive-capacitive network connected to said trigger terminal, and including a resistive divider coupled to said trigger terminal, one of said main electrodes and one of said first and second terminals.

7. A power control circuit according to claim 4 wherein said switching means comprises:

a semiconductor unit connected across said first and second terminals and having a gate electrode separately coupled to one of said main electrodes of said semiconductor device.

8. A power control circuit according to claim 7 wherein said semiconductor unit comprises:

a silicon controlled rectifier having said gate electrode.

9. A power control circuit according to claim 8 wherein said silicon controlled rectifier has a cathode and anode connected to said first and second terminals, respectively.

10. A power control circuit according to claim 4 wherein said semiconductor unit comprises:

a resistive-capacitive circuit connected across said first and second terminals.

11. A power control circuit according to claim 4 wherein said switching means comprises:

a pair of main thyristors connected in parallel across said first and second terminals and each having a gate electrode connected to a common terminal;

a pilot thyristor connected between said common terminal and one of said first and second terminals, said pilot thyristor having a gate electrode connected to one of said main electrodes of said semiconductor device; and a capacitive shunt coupled to said common terminal.

12. A power control circuit according to claim 4 wherein said switching means comprises:

a pair of power thyristors connected in parallel across said first and second terminals and each having a gate electrode connected to a common terminal;

a first pilot thyristor connected between said common terminal and one of said first and second terminals;

a first capacitive shunt coupled to said gate of said first pilot thyristor;

a pair of intermediate thyristors connected in parallel between the gate of said first pilot thyristor and one of said first and second terminals, said pair of intermediate thyristors each having a gate electrode connected to an intermediate terminal;

an intermediate capacitive shunt coupled to the gates of said intermediate thyristors;

a second pilot thyristor connected between said intermediate terminal and one of said first and second terminals, said pilot thyristor having a gate connected to one of said main electrodes of said semiconductor device; and a third capacitive shunt coupled to said gate of said second pilot thyristor.

13. A power control circuit according to claim 1 wherein said predetermined voltage rating of said load is less than 50 percent of the voltage rating of said alternating voltage source.

14. A power control circuit according to claim 1 wherein said alternating voltage source is rated nominally at 115 VAC and said predetermined voltage rating of said load is less than half of said alternating voltage source.

15. A power control circuit according to claim 1 wherein the intervals of operation for said switching means occur subsequent to the peak voltage of said positive alternate half cycles and only between 90° and 180° of said 360° full cycle of said alternating voltage source, wherein said full cycle of said alternating voltage source begins at zero degrees and zero volts in a positive transition.

16. A power control circuit according to claim 1 wherein said load comprises a low voltage incandescent light.

17. A power control circuit according to claim 16 wherein said switching means is timed by said timing means to drive said light to produce a perceived brightness approximately that produced when said conventional light is driven without switching at said rated voltage.

18. A power control circuit for use with a low voltage load having predetermined voltage rating, said circuit comprising:

a first terminal adapted to connect to said load;

a second terminal adapted to be connected through a power switch to an alternating voltage source having a magnitude rated substantially in excess of said predetermined voltage rating;

a switching means serially connected between said first and second terminal;

timing means coupled to said switching means for periodically operating said switching means at a frequency proportional to that of said alternating voltage source for intervals of less than 90° of a 360° full cycle on only positive half cycles of said alternating voltage source, said switching means being timed by said timing means to keep the magnitude of average voltage to said load less than that of said alternating voltage source for alternate positive half cycles of said alternating voltage source.

19. A power control circuit according to claim 18 wherein said circuit further includes a low voltage load.

20. A power control circuit according to claim 19 wherein said switching means is timed by said timing means to drive said light to produce a perceived brightness approximately that produced when said light is driven without switching at said rated voltage.

21. A power control circuit according to claim 18 wherein said predetermined voltage rating of said load is less than 50 percent of the voltage rating of said alternating voltage source.

22. A power control circuit according to claim 18 wherein said timing means is selectively adjustable to set the magnitude of average voltage to said load.

23. A power control circuit according to claim 18 wherein said switching means is timed by said timing means to conduct on only the negative transition of said positive alternate half cycles of said alternating voltage source, said intervals of conduction occurring subsequent to the peak voltage of said alternate positive half cycles, whereby the voltage of said alternating voltage source is always decreasing, and wherein the voltage applied to said load starts at a substantially instantaneous rate of rise.

24. A power control circuit according to claim 19 wherein said load comprises an incandescent light.

25. A power control circuit according to claim 18 wherein said said alternating voltage source is rated nominally at 115 VAC and said predetermined voltage rating of said load is less than half of said alternating voltage source.

26. A method for controlling power by means of a power control circuit including switching means and timing means to a low voltage load having a predetermined voltage rating from an alternating voltage source having a magnitude rated substantially in excess of said predetermined voltage rating, comprising the steps of:

periodically switching said voltage source to said load at a frequency proportional to that of said alternating voltage source, the switching being timed to operate said switching means for intervals of less than 90° of a 360° full cycle on only positive half cycles of said alternating voltage source.

27. A method according to claim 26 wherein the step of switching comprises the step of:

selectively adjusting the magnitude of average voltage to said load.

28. A method according to claim 26 wherein the step of switching comprises the step of:

setting the magnitude of average voltage to said load at a maximum average that is less than half the magnitude of average voltage of said alternating voltage source for a half cycle of said alternating voltage source.

29. A method according to claim 26 wherein the step of switching comprises the step of:

timing the switching to conduct on alternate positive half cycles of said alternating voltage source wherein the intervals of operation for said switching means occur subsequent to the peak voltage of said alternate positive half cycles and between 90° and 180° of said 360° full cycle of said alternating voltage source, wherein said full cycle of said alternating voltage source begins at zero degrees and zero volts in a positive transition, and wherein the voltage to said load is applied at a substantially instantaneous rate of rise.

30. A method according to claim 26 wherein the step of switching comprises the step of:

timing the switching to conduct on only the negative transition of said alternate half cycles of said alternating voltage source.

31. A method according to claim 26 wherein said load comprises an incandescent light and wherein the step of switching comprises the step of:

timing the switching to produce a perceived brightness from said light approximating that produced when said light is driven without switching at said rated voltage.

32. A method according to claim 26, further including the step of:

providing a low voltage load to said power control circuit wherein said low voltage load has a voltage rating less than half of a nominally rated 115 VAC source.

33. A method according to claim 26, further including the step of:

capacitively shunting transient current flowing through said power control circuit.

34. A power control circuit comprising:

a first terminal adapted to connect to a low voltage load;

a second terminal adapted to be connected through a power switch to an alternating voltage source having a magnitude rated substantially in excess of said predetermined voltage rating;

a silicon controlled rectifier (SCR) having a cathode and anode connected to said first and second terminals, respectively, and having a gate electrode;

a resistive-capacitive circuit connected across said first and second terminals for shunting from said thyristor transient currents flowing through said load;

a capacitive shunt coupled to said gate electrode;

timing means coupled to said thyristor for periodically operating it at a frequency proportional to that of said alternating voltage source, said SCR being timed by said timing means to conduct at alternate positive half cycles of said alternating voltage source for less than 90° of a 360° full cycle to fix the magnitude of average voltage to said load at a predetermined constant that is less than the magnitude of average voltage of said alternating voltage source for said alternate half cycles, said SCR being timed to conduct between the interval of 90° and 180° of said full cycle of said alternating voltage source, wherein said full cycle begins at zero degrees and zero volts, wherein the voltage from said alternating voltage source is applied at a high rate of rise, said timing means comprising:

(a) a unijunction transistor having a trigger terminal and a pair of main electrodes, at least one of said electrodes being connected to said gate electrode of said thyristor, said unijunction transistor being rendered conductive by voltage in excess of a predetermined threshold at said trigger terminal;

(b) a capacitive element coupled between said trigger terminal and one of said main electrodes for providing a degree of immunity to supply transients, and (c) a timing circuit connected to said trigger terminal for supplying to it a triggering pulse, aid timing circuit including (i) a resistive-capacitive network connected to said trigger terminal, and (ii) a resistive divider coupled to said trigger terminal, one of said main electrodes and one of said first and second terminals.

35. The power control circuit of claim 34, further including a low voltage load having a voltage rating less than 50 percent of a nominally rated 115 VAC source.

* * * * *